United States Patent [19]

Hoffman et al.

[11] 4,171,588
[45] Oct. 23, 1979

[54] PLASTIC CARRYING CASE FOR A FISHING ROD AND REEL

[75] Inventors: John A. Hoffman, Brighton; Orlando Bessey, Fowlerville, both of Mich.

[73] Assignee: E-Z Pak, Inc., Brighton, Mich.

[21] Appl. No.: 894,977

[22] Filed: Apr. 10, 1978

[51] Int. Cl.² ............................................. A01K 97/08
[52] U.S. Cl. ..................................... 43/26; 206/315 R
[58] Field of Search ...................... 43/26; 220/4 B, 8; 206/315; 224/5 E, 5 F

[56] References Cited

U.S. PATENT DOCUMENTS

| | | | |
|---|---|---|---|
| 2,650,449 | 9/1953 | Suring | 43/26 |
| 2,902,790 | 8/1959 | Harvey | 43/26 |
| 3,641,697 | 2/1972 | Heidtman | 43/26 |
| 3,744,687 | 7/1973 | Oreck | 220/8 |

Primary Examiner—Nicholas P. Godici
Attorney, Agent, or Firm—Arnold, White & Durkee

[57] ABSTRACT

A plastic carrying case is disclosed along with the method of manufacture and the mold tool. The carrying case is particularly suited for transporting and storing a fishing rod and reel, and is comprised of two plastic members which may be interlocked by a snap fit. A first plastic member includes an elongated tubular section to receive a rod and an enlarged, essentially tubular section to receive the reel. A second plastic member includes an enlarged, essentially tubular section having snap-fit interlocking surfaces which cooperate with complementary surfaces on the enlarged section of the first member to maintain the two plastic members in interlocked relationship when desired. The method of manufacture includes extruding a tube of thermoplastic material between the opened sections of a blow mold, closing the molds, and inflating the tube to a blown product conforming to the shape of the internal mold cavity. Thereafter, the blown product is removed from the mold and trimmed by removing an annular plastic strip to form the product into two members having confronting end portions that may be overlapped for a snap fit.

4 Claims, 8 Drawing Figures

PLASTIC CARRYING CASE FOR A FISHING ROD AND REEL

BACKGROUND OF THE INVENTION

1. Field of the Invention

The present invention relates primarily to a plastic carrying case and to a method and blow mold tool for forming a plastic carrying case. More specifically, the plastic case is preferably designed to carry a fishing rod and reel.

2. The Prior Art

Prior carrying cases for items such as rods and reels have typically been formed of a wooden exterior and have included interior recesses to receive disassembled components of the rod and reel assembly. As a result, this type of carrying case has not been used on a widespread basis for several reasons. First, because of their nature and construction, these carrying cases have been relatively costly to manufacture. Second, these cases require a substantial amount of time to manufacture due to the interlocking wooden pieces and the assembly of the internal components, such as applying a felt cover over an interior recessed member. Third, this carrying case has required disassembly of the rod and reel for transportation and storage, a chore which the typical fisherman would prefer to eliminate.

Accordingly, a long-felt need has existed in the prior art for a carrying case which is durable, which may be made on a mass-production basis, which is relatively inexpensive to manufacture and which will accommodate the storage and transportation of a fully assembled rod and reel.

SUMMARY OF THE INVENTION

The present invention fulfills this long-felt need and eliminates the disadvantages and shortcomings of the prior types of devices through a plastic carrying case comprised of two members that are preferably snap fit together.

More particularly, one member of the proposed carrying case includes an elongated, essentially tubular section which is closed at a first end and is adapted to receive a fishing reel. An enlarged, essentially tubular section on the first member is integral with the elongated tubular section and includes an open end for receiving the reel of the rod and reel assembly.

A second member of the carrying case includes a portion conforming generally in shape to the open end of the enlarged section on the first member for closing the first member to establish an enclosure for carrying a rod and reel assembly. Preferably, the first and second members include cooperating locking surfaces for retaining the members in an interlocked relationship.

According to the disclosure, the enlarged section on the first member includes an integral annular terminal flange including a plurality of peripherally spaced, localized convexed protuberances forming the locking surfaces on said first member. The second member includes an enlarged portion adapted to receive a portion of the reel, with the enlarged portion terminating in an annular end having an inner diameter essentially the same as, but slightly larger than, the outer diameter of the annular flange on the first member to accommodate an overlapping, snap-fit. The interior of the annular flange on the second member includes a plurality of peripherally spaced, localized indents forming the locking surfaces on the second member, such indents being adapted to receive respective protuberances on the first member for interlocking said first and second members together.

In the preferred embodiment, the second member includes a closed-end essentially tubular portion extending away from the enlarged portion to receive a handle on a rod and reel assembly. Additionally, a safety chain may be connected to the interior of the enlarged portions on the first and second members to assure that one of the members does not become lost from the other. Most preferably, the first member includes an integral tubular handle so that someone may hand-carry the plastic case. Also, an integral, tubular grip may be provided on the second member to provide a gripping surface for pulling the first and second members apart to either insert or displace a rod and reel assembly.

The mold tool forming the plastic carrying case includes a pair of essentially identical blow mold sections that may be closed together to form an internal blow mold cavity conforming to the external shape of the desired blown product. Each mold section includes an elongated, essentially semi-cylindrical cavity portion which blends into an enlarged, essentially semi-cylindrical recess. The enlarged recess includes a peripheral raised portion to define a peripheral flange on the carrying case and a peripherally enlarged portion adjacent the raised portion on the side away from the elongated semi-cylindrical cavity. A plurality of localized, peripheral indents are provided on the raised portion, along with a plurality of localized, peripheral indents on the enlarged portion, the indents on the enlarged portion being axially aligned with respective indents on the raised portion and being slightly larger than the indents on the raised portion. As will be appreciated, the height of the raised portion is on the order of about one-sixteenth of an inch, i.e. approximately the wall thickness of the plastic product, to accommodate the overlapping, snap-fit after appropriately trimming the blown article.

In the method of forming the carrying case, an elongated tube of thermoplastic material is first extruded between a pair of blow mold sections. Thereafter, the mold sections are closed around the plastic tube to form a blowable thermoplastic parison enclosed within a mold cavity which is cooperatively defined between the closed mold sections. Next, blow fluid under pressure is introduced into the interior of the parison to expand the thermoplastic material against the mold cavity wall. By this operation, a blown carrying case is formed according to the present disclosure, but with the two members integrally connected. This blown product includes an elongated tubular section integral with an enlarged, essentially tubular section which includes an annular flange formed by the raised peripheral portion on the mold and an annular enlargement adjacent the annular flange formed by the peripherally enlarged portion on the mold.

After the blown product has cooled sufficiently to achieve a self-sustaining condition, the product is removed from the mold in preparation for a trimming operation. The blown product is trimmed by removing an annular strip which includes a narrow segment of the annular flange and a narrow segment of the annular enlargement, thereby forming the two plastic members for the carrying case. As a result of the trimming operation, the annular flange is defined on one of the formed members and the annular enlargement is formed on the other of the members, providing the geometry for the overlapping, snap-fit interlock between the two members.

Accordingly, the present invention provides several advantages to the fisherman, including: (1) the carrying case is made of a plastic material and is therefore durable, adaptable to mass production, and may be made at a relatively low cost; (2) the design of the carrying case is such that it is trim and compact and therefore easy to store or carry; (3) the carrying case accommodates storing or transporting a rod and reel assembly without disassembly of the rod and reel into its component parts; therefore, when the fisherman reaches the fishing site the rod and reel may be retracted from the carrying case for instant use and likewise, after fishing, the rod and reel may be inserted into the carrying case for instant transport; (4) the very nature of a carrying case eliminates tangling of the fishing line during transport; (5) the carrying case provides protection to the rod and reel to prevent breakage and damage; and (6) the carrying case provides at least some flotation when the two members are interlocked together, so that if the case is dropped into the water, such as overboard a boat, the carrying case will not instantly sink so that the enclosed rod and reel may be retrieved.

These and other meritorious features and advantages will be more fully appreciated from the following detailed description and the appended claims.

DETAILED DESCRIPTION OF THE PREFERRED EMBODIMENT

The Plastic Carrying Case

Figure 1:
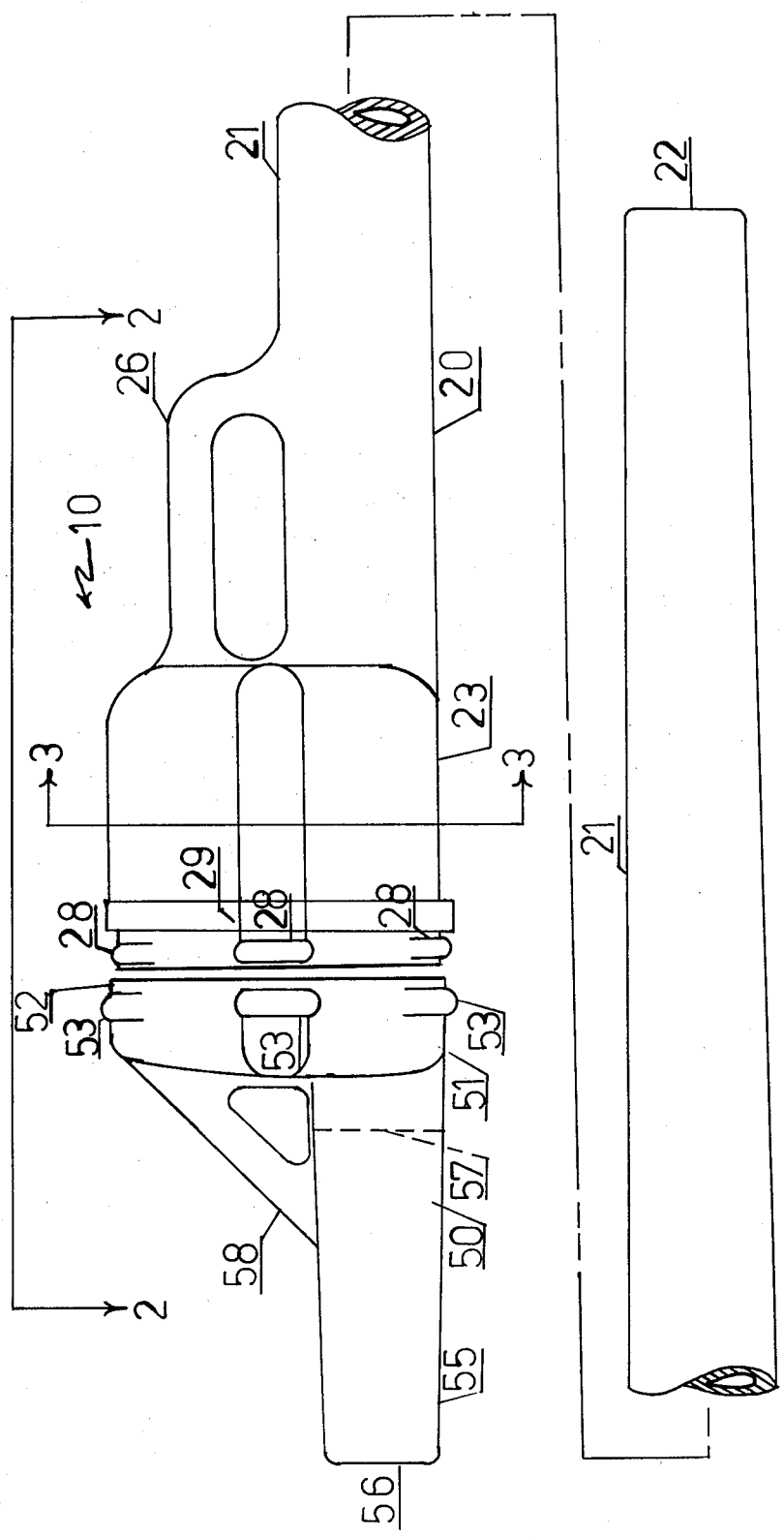
FIG. 1 is a side elevational view of the plastic carrying case, illustrating the overall product in its preferred embodiment.

Referring now more particularly to the drawings, FIGS. 1-4 illustrate a plastic carrying case 10, which is comprised of two primary components 20 and 50 for carrying an assembled rod and reel. In general, component 20 is configured to receive the rod and a portion of the reel while component 50 primarily closes off the internal chamber and receives a portion of the reel and the handle of the rod.

More specifically, member 20 includes an elongated, tubular portion 21 which terminates in a distal closed end 22. This tubular portion blends into and is integral with an enlargement region 23 for receiving the reel, the enlargement being shown collectively in FIGS. 1-3. As illustrated best in FIG. 3, the enlargement includes diametrically opposed, outwardly bulging regions 24 and 25 to receive the winding mechanism of the reel. Additionally, a tubular, curved handle 26 is integrally interconnected between the elongated tube portion 21 and the enlargement 23 to provide a means for hand-carrying the case.

As will be appreciated, the length of tube section 21 and the diameter of the enlargement 23 may be selected as desired, to conform to various sizes of rods and reels. Most preferably, section 21 will be about 32 inches long from its point of intersection with portion 23 in order to accommodate most any size rod and reel assembly. Likewise, the outer overall dimension of enlargement 23 is selected to be about six inches, again for the purpose of receiving even the larger reels.

Enlarged portion 23, which is offset from the axis of tubular portion 21, preferably terminates in an annular, reduced flange 27. This flange may include a plurality of peripherally spaced, localized protuberances 28 which provide a locking arrangement for cooperating with and selectively retaining member 50, as will be more fully disclosed below. Four such protuberances are shown, but six may be preferred to enhance the interlock of the two main components of the case. An optional annular enlarged flange 29 may be provided on portion 23 adjacent the reduced annular flange 27 for aesthetic purposes.

Figure 2:
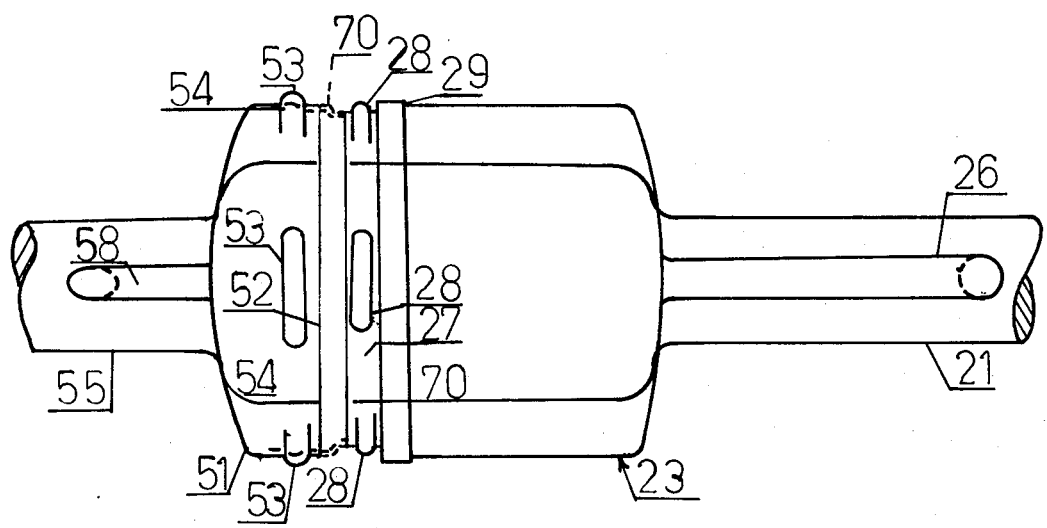
FIG. 2 is a top plan view taken along plane 2—2 as illustrated in FIG. 1, illustrating the reel portion of the carrying case.
Figure 3:
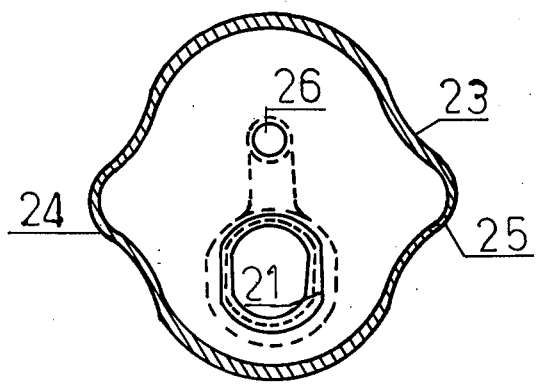
FIG. 3 is a cross-sectional view taken along plane 3—3, as illustrated in FIG. 1.
Figure 4:
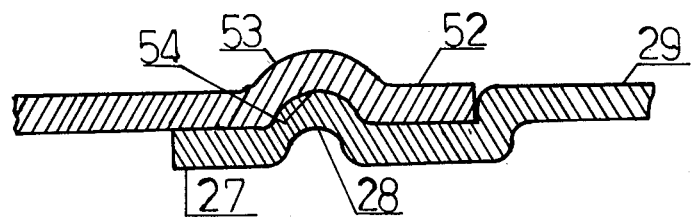
FIG. 4 is an enlarged, fragmented view illustrating the cooperating overlapping surfaces on the plastic components to establish the snap-fit.

Component 50 includes an enlarged portion 51 which is generally shaped similar to portion 23 in cross section, as shown in FIGS. 1 and 2. Portion 51 terminates in an annular region 52 which is sized to overlap the annular flange 27 of component 20 for a snap fit. This region 52 includes four or six peripherally spaced localized protuberances 53, forming internal indent surfaces 54 to receive and snap over the projections 28 on the annular flange 27, as shown in FIG. 4. Preferably, for aesthetic purposes, the outer diameter of annular region 52 is essentially the same as that for the enlarged flange 29 to provide a flush appearance, also as shown in FIG. 4. As will be appreciated, the outer diameter of annular flange 27 is about the same as, but slightly less than, the internal diameter of region 52 to achieve the desired overlapping, snap-fit.

Component 50 also includes a tubular section 55 extending from the enlarged portion 51 in general axial alignment with the elongated tubular section 21 of component 20. Section 55 terminates in an end wall 56 and provides a space for receiving the handle of a rod and reel. Optionally, a sponge material 57 may be placed in section 55 to prevent axial displacement of the rod and reel assemblies having short handles. As shown in FIGS. 1 and 2, a tubular grip 58 integrally extends between section 51 and 55, providing a gripping surface for use in separating components 20 and 50 from the overlapped, interlocked position represented by FIG. 4.

Optionally, but preferably, a small chain (not shown) is secured at its ends to the interior of components 20 and 50 by rivets so that one of these components does not become lost from the other. Ideally, the chain is about ten inches long so that component 50 can be retracted over the handle of the rod and reel.

FIG. 2 shows a stepped, annular region 70 in phantom between annular flange 27 and annular end portion 52 of component 50. This phantom outline represents an annular segment of material that is trimmed away from the product as formed in a blow molding operation to be more fully disclosed below. The step in the formation of the product at this position provides the reduced annular flange 27 and the enlarged flange 52 for the overlapping fit.

The Mold and Method Of Manufacture

Figure 5:
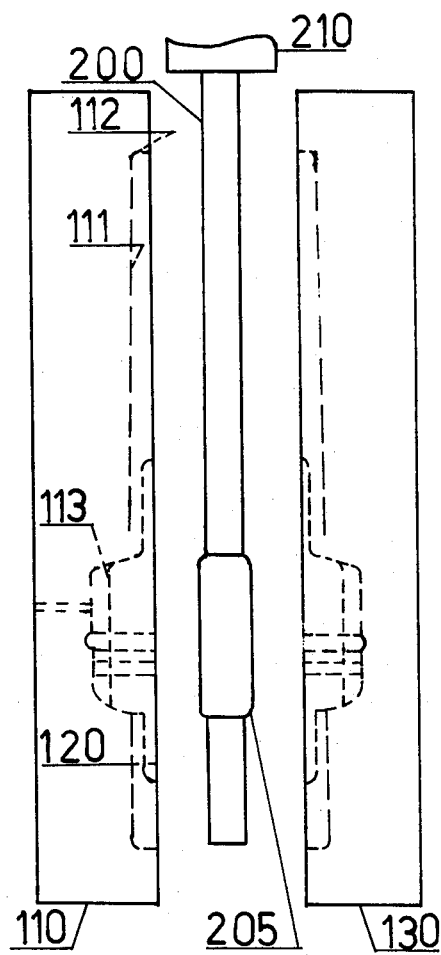
FIGS. 5 and 6 are schematic illustrations showing the blow molding operation.
Figure 6:
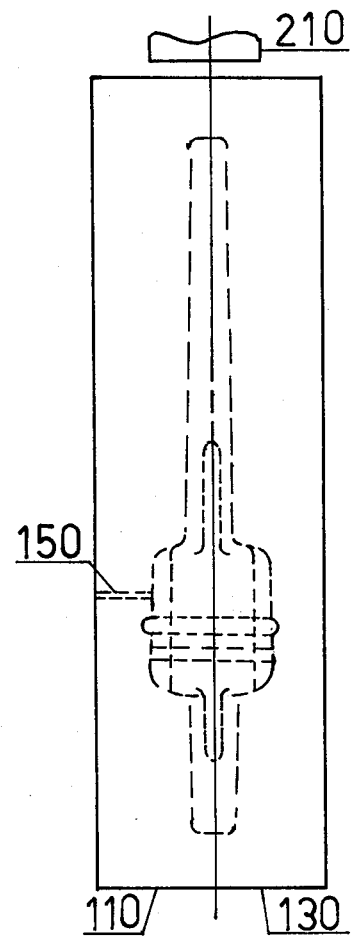
Figures 7, 8:
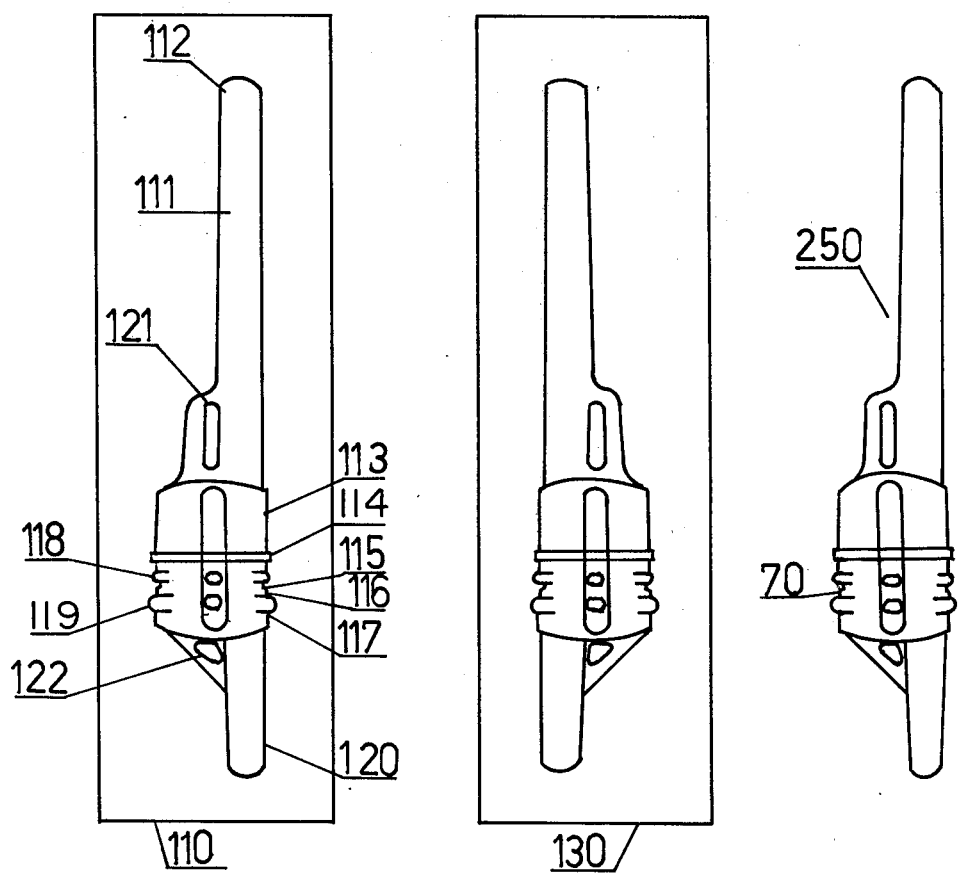
FIG. 7 is a side elevation illustrating the mirror-image cavities in the two mold sections.
FIG. 8 is a side elevation of the blown product prior to a trimming operation to remove an annular strip to form the two plastic components which overlap in interlocking relationship.

FIGS. 5–7 illustrate the mold assembly used in the manufacture of the previously disclosed carrying case 10. This assembly includes a pair of sectional blow molds 110 and 130 which include mirror image mold cavities conforming to the exterior surface of the case shown in FIGS. 1–3. As such, the description of the mold cavity will be directed toward mold section 110, it being understood that section 130 includes essentially identical features.

First, mold section 110 includes an elongated, essentially semi-cylindrical cavity 111 which forms component section 21 on the case. Cavity 111 terminates at one end in a wall 112 and at the other end blends into an enlarged essentially semi-cylindrical recess 113 that forms component parts 23 and 51 and the stepped region 70. Therefore, recess 113 includes: an annular indent 114 to form the annular raised portion 29; a peripheral raised portion 115 to form the reduced annular flange 27; a peripheral stepped region 116 to form the step 70; and a peripheral region 117 to form portion 51 on component 50. The height of the raised portion 115 should be on the order of about one-sixteenth inch to provide the desired geometry for the overlapping snap fit. Additionally, each mold section includes a plurality of localized indents 118 and 119 respectively in the raised portion 115 and peripheral region 117 to form respective protuberances 28 and 53 on the carrying case. Naturally, the mold cavities will also include recesses to form the other portions of the carrying case, such as a secondary semi-cylindrical cavity 120 to form a handle component 55 and recesses 121 and 122 to respectively form the handle 26 and grip 58. Most preferably, the mold cavity recesses are etched to provide a grained appearance to the exterior of the carrying case.

In the method of making a plastic carrying case according to the present invention, an elongated tube 200 of thermoplastic material, preferably high density polyethylene, is extruded from a die head 210 between opened mold sections 110 and 130. Ideally, the tube will include a thicker section 205 which is used to form component sections 23 and 51, the section 205 being formed by varying the extrusion orifice in accordance with conventional extrusion techniques. Then, the mold sections 110 and 130 are closed around the tube by conventional power means (not shown) to pinch shut the ends to form a blowable parison. At about the same time the tube may be severed below the extrusion die 210. Next, a blow pin (not shown) is advanced through an opening 150 in mold section 110 to penetrate the wall of the thermoplastic material and to supply air under pressure to the interior of the parison to expand the parison to the shape of the internal mold cavity. Most preferably, the blow molding operation is performed when the thermoplastic material is at a temperature conducive to molecular orientation so that the plastic material of the final article will be molecularly oriented.

The blown article 250, as shown in FIG. 8, is then removed from the blow mold cavity after sufficiently cooling to a selfsustaining condition. Thereafter a trimming operation is performed to remove approximately a one-half inch annular segment including the stepped region 70, to form the product into two components having annular regions capable of overlapping for the disclosed interlocking relationship. This annular trimming may be performed, for example, by a pair of laterally spaced rotary saws. Finally, the optional safety chain may be attached by rivets. Of course other trimming operations may be required to remove material along the pinch line of the mold sections.

As will be appreciated, the disclosed product, mold, and method may be modified as desired without departing from the overall inventive concept, since the invention is limited only by the appended claims and their legal equivalents. For example, the configuration of member 50 may be modified to become an essentially flat end enclosure. Other modifications might include an alternative interlocking structure for components 20 and 50, such as integrally molded threads.

We claim:

1. A plastic carrying case for a fishing rod and reel, comprising:

a first integral, unitary plastic member and a second integral, unitary plastic member formed together by blow molding and then severed in a direction essentially perpendicular to the longitudinal axis thereof to form said two separate members;

said first member including (a) an elongated, essentially tubular, section closed at a first end and being adapted to receive a fishing rod, (b) an enlarged, essentially tubular section integral with a second, open end of the elongated tubular section and having an open end for receiving the reel of a rod and reel assembly, the axis of the enlarged section being offset from and essentially parallel to the elongated tubular section, and (c) an integral tubular handle extending from an offset portion of said enlarged portion to the elongated tubular section; and said second member having (a) a first enlarged portion conforming generally in shape to the open end of the enlarged tubular section for receiving a portion of the reel and for closing said first member to establish an enclosure for carrying a rod and reel; and (b) an essentially tubular section extending away from said portion and terminating in a closed end for accommodating the receipt of a handle on the rod and reel, the tubular sections of said first and second members being essentially coaxial;

said first and second members including cooperating locking surfaces for retaining said members in an interlocked relationship, wherein the enlarged section of the first member includes an integral annular terminal flange having an axis generally parallel with the axis of the elongated tubular section and the enlarged portion of said second member includes an integral annular flange, one of said annular flanges having an inner diameter essentially the same as, but slightly larger than, the outer diameter of the other annular flange to accommodate fitting thereover, and one of said annular flanges having a plurality of peripherally spaced, localized indents forming locking surfaces and being adapted to receive respective peripherally spaced protuberances on the other annular flange for interlocking said first and second members together.

2. The carrying case as defined in claim 1, characterized by the flange on said second member having the inner diameter which is slightly larger than the outer diameter on the flange of the first member, the flange on said second member including the plurality of peripherally spaced indents on its inner diameter surface, and the flange on said first member including the plurality of peripheral protuberances on its outer diameter surface.

3. The carrying case as defined in claim 2, wherein an enlarged peripheral flange is included on said first member adjacent the terminal annular flange, with the outer diameter on said enlarged peripheral flange being essentially the same as the outer diameter of the annular terminal flange on the second member.

4. The carrying case as defined in claim 2, wherein the axis of the enlarged portion is offset from the axis of the tubular portion of the second member and wherein the second member further includes an integral tubular grip extending from an offset portion of said enlarged section to the tubular section on said second member.

* * * * *